(12) United States Patent
Ali et al.

(10) Patent No.: US 11,895,468 B2
(45) Date of Patent: Feb. 6, 2024

(54) SYSTEM AND METHOD FOR SYNCHRONIZATION OF MULTI-CHANNEL WIRELESS AUDIO STREAMS FOR DELAY AND DRIFT COMPENSATION

(71) Applicant: HARMAN INTERNATIONAL INDUSTRIES, INCORPORATED, Stamford, CT (US)

(72) Inventors: Hussnain Ali, Frisco, TX (US); Srinath Arunachalam, Dallas, TX (US); Kadagattur Gopinatha Srinidhi, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 180 days.

(21) Appl. No.: 17/589,224

(22) Filed: Jan. 31, 2022

(65) Prior Publication Data

US 2023/0247353 A1 Aug. 3, 2023

(51) Int. Cl.
*H04R 3/00* (2006.01)
*H04R 3/04* (2006.01)
*H04S 5/00* (2006.01)
*H04R 5/04* (2006.01)

(52) U.S. Cl.
CPC ................. *H04R 3/00* (2013.01); *H04R 5/04* (2013.01); *H04S 5/00* (2013.01); *H04R 2420/07* (2013.01); *H04S 2400/01* (2013.01)

(58) Field of Classification Search
CPC .......... H04S 5/00; H04S 7/30; H04S 2400/01; H04S 7/00; H04R 3/00; H04R 5/04; H04R 2420/07
See application file for complete search history.

(56) References Cited

U.S. PATENT DOCUMENTS

| 7,400,653 | B2 | 7/2008 | Davies et al. | |
| 2006/0104223 | A1 | 5/2006 | Glatron et al. | |
| 2009/0323991 | A1* | 12/2009 | Hudson | H04S 7/301 |
| | | | | 381/303 |
| 2015/0163616 | A1* | 6/2015 | Chatterjee | H04R 5/02 |
| | | | | 381/303 |

(Continued)

FOREIGN PATENT DOCUMENTS

| CN | 109565662 A | * | 4/2019 | ......... H04B 10/1141 |
| KR | 20210030684 A | * | 3/2021 | |

*Primary Examiner* — David L Ton
(74) *Attorney, Agent, or Firm* — Brooks Kushman P.C.

(57) ABSTRACT

In at least one embodiment, a system for synchronizing an audio stream is provided. The system includes a first loudspeaker and an audio controller. The first loudspeaker plays back a first audio output signal including first signature information. The audio controller provides a first audio input signal and superimpose the first signature information on the first audio input signal. The audio controller receives the first audio output signal including the first audio packets and the first signature information and to detect the first signature information. The audio controller determines a delay attributed to a transmission of the first audio input signal and the first audio output signal based on the first signature information and synchronizes the transmission of a second audio input signal from the audio controller to the first loudspeaker with the playback of another audio output signal from a second loudspeaker based at least on the delay.

20 Claims, 11 Drawing Sheets

(56) References Cited

U.S. PATENT DOCUMENTS

| | | | |
|---|---|---|---|
| 2018/0167149 A1 | 6/2018 | Stilwell et al. | |
| 2019/0342659 A1* | 11/2019 | Lau | H04S 7/301 |
| 2019/0387344 A1* | 12/2019 | Kim | H04R 5/04 |
| 2020/0336857 A1* | 10/2020 | Kim | H04S 7/301 |
| 2020/0404440 A1* | 12/2020 | Escande | H04R 29/002 |
| 2023/0112398 A1* | 4/2023 | Fitzpatrick, III | H04B 17/327 |
| | | | 370/329 |

* cited by examiner

SYSTEM AND METHOD FOR SYNCHRONIZATION OF MULTI-CHANNEL WIRELESS AUDIO STREAMS FOR DELAY AND DRIFT COMPENSATION

TECHNICAL FIELD

Aspects disclosed herein generally relate to a system and method for synchronization of multi-channel wireless audio streams for delay and drift compensation. More specifically, the disclosed system and method provides, inter alia, acoustic alignment of multichannel wireless audio streams. These aspects and others will be discussed in more detail below.

BACKGROUND

In a wireless multi-channel audio device/system, multiple audio streams are relayed from a media source to various sink devices over a wireless link. The wireless link may be Bluetooth, Wi-Fi, Wireless Speaker and Audio Association (WISA), or any radio frequency (RF) based communication set up. Wireless surround sound systems, such as home theaters, serve as common examples of such systems. Other examples of the applications include wireless earbuds, soundbars with removable surround speakers, and audio-video home theaters, to name a few. While wireless audio transmission provides a great level of convenience from the usability perspective, wireless audio transmission is prone to transmission latency and buffering that may fluctuate across the wireless channels.

SUMMARY

In at least one embodiment, a system for synchronizing an audio stream is provided. The system includes a first loudspeaker and an audio controller. The first loudspeaker is configured to playback a first audio output signal including first audio packets and first signature information in response to a first audio input signal. The audio controller is programmed to provide the first audio input signal and to superimpose the first signature information on the first audio input signal prior to the first loudspeaker playing back the first audio output signal. The audio controller is further programmed to receive the first audio output signal including the first audio packets and the first signature information and to detect the first signature information on the first audio output signal. The audio controller is further programmed to determine a delay attributed to a transmission of the first audio input signal and the first audio output signal based on the first signature information; and to synchronize the transmission of the first a second audio input signal from the audio controller to the first loudspeaker such that the playback of a second audio output signal from the first loudspeaker is synchronized with the playback of another audio output signal from a second loudspeaker based at least on the delay.

In at least another embodiment, a method for synchronizing an audio stream is provided. The method includes providing, via an audio controller, a first audio input signal including audio packets and a first signature information to a first loudspeaker that plays back a first audio output signal including the audio packets and the first signature information and superimposing the first signature information on the first audio input signal prior to the first loudspeaker playing back the first audio output signal. The method further includes receiving the first audio output signal and the first signature information and detecting the first signature information on the first audio output signal. The method further includes determining, via the audio controller, a delay attributed to a transmission of the first audio input signal and the first audio output signal based on the first signature information; and synchronizing the transmission of a first second audio input signal from the audio controller to the first loudspeaker such that the playback of the a second audio output signal from the first loudspeaker is synchronized with the playback of another audio output signal from a second loudspeaker based at least on the delay.

A computer-program product embodied in a non-transitory computer read-able medium that is programmed for synchronizing an audio stream is provided. The computer-program product comprises instructions for providing, via an audio controller, a first audio input signal to a first loudspeaker to playback a first audio output signal in response to the first audio input signal and for superimposing first signature information on the first audio input signal prior to the first loudspeaker playing back the first audio output signal. The computer-program product includes receiving the first audio output signal and the first signature information and detecting the first signature information on the first audio output signal. The computer-program product further includes determining, via the audio controller, a delay attributed to a transmission of the first audio input signal and the first audio output signal based on the first signature information and synchronizing the transmission of a second audio input signal from the audio controller to the first loudspeaker such that the playback of a second audio output signal from the first loudspeaker is synchronized with the playback of another audio output signal from a second loudspeaker based at least on the delay.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers/devices as disclosed herein and in the attached Appendix may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein. While the various systems, blocks, and/or flow diagrams as noted herein refer to time domain, frequency domain, etc., it is recognized that such systems, blocks, and/or flow diagrams may be implemented in any one or more of the time-domain, frequency domain, etc.

Figure 1:
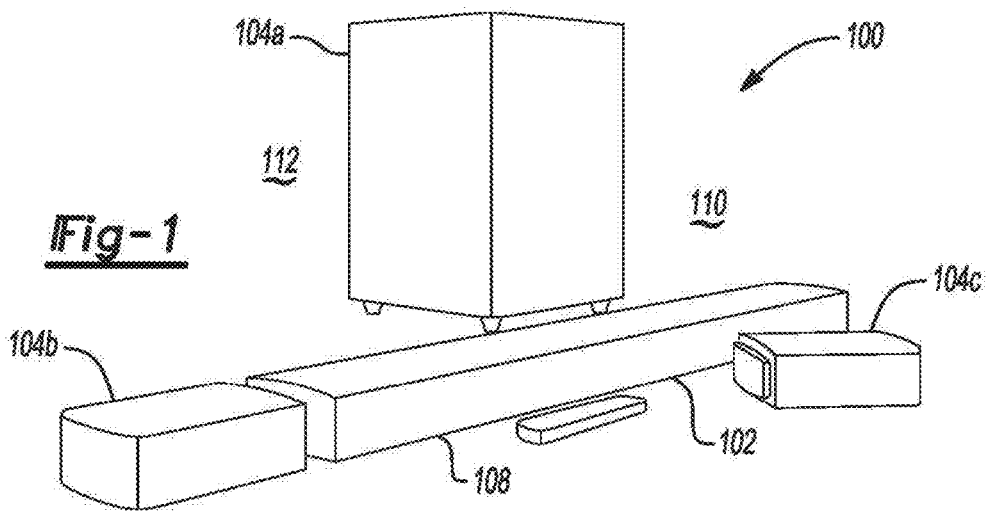
FIG. 1 depicts one example of a multi-channel wireless audio system in accordance with one embodiment.
Figure 2:
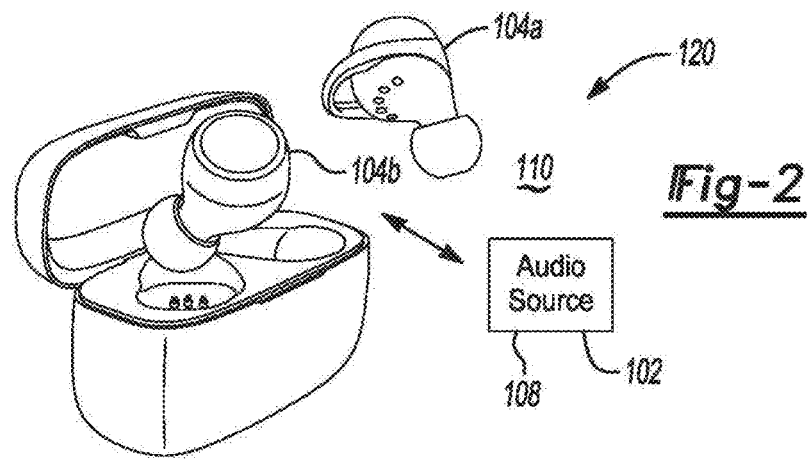
FIG. 2 depicts another example of a multi-channel wireless audio system in accordance with one embodiment.
Figure 3:
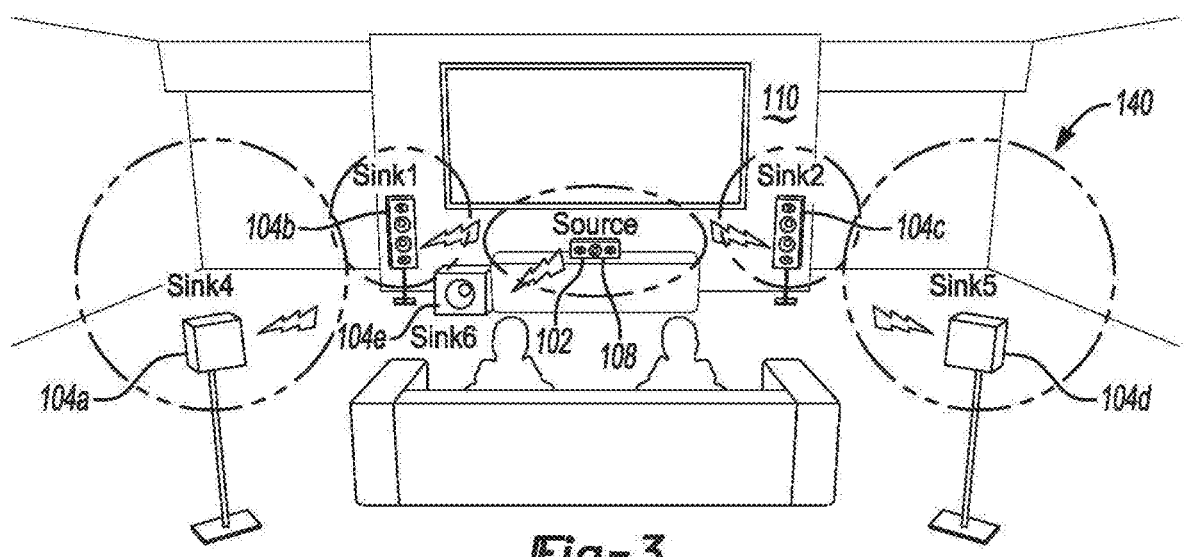
FIG. 3 depicts another example of a multi-channel wireless audio system in accordance with one embodiment.

FIGS. 1, 2 and 3 depict multi-channel wireless audio systems 100, 120, and 140, respectively, that may exhibit transmission latency and misalignment of audio data during audio playback for a user. For example, each of the systems 100, 120, and 140 generally include an audio source (or audio controller) 102 and a plurality of loudspeakers (or sink devices) 104 (e.g., loudspeakers 104a-104c for the system 100, loudspeakers 104a-104b for the system 120, and the loudspeakers 104a-104d for the system 140).

When the audio source 102 transmits audio signals to the various loudspeakers 104 (or sink devices) over a wireless channel 110, compressed digital audio packets are transmitted to the loudspeakers 104 which are then decoded and rendered (or played back) by the loudspeakers 104. It is recognized that the audio source 102 includes any number of controllers to generate at least the audio packets and any number of transceivers to transmit at least the digital audio packets to the loudspeakers 104. While there may be a notion of time in the packets, the interpretation of that information may not be enforced for compliance. Also, clock drifts attributed to electronics in the audio source are a serious problem which exacerbates over time. Such clock drifts may be caused due to internal tolerance stack buildup of difference microprocessors that are implemented in the audio source 102 for different channels. In the case of multiple wireless channels, the loudspeakers 104 generally do not communicate with one another (i.e., or with other sink devices) to ensure uniformity in audio playback content. Since a single clock may not be shared by the sink devices, misalignments in the audio path can occur. These misalignments in the audio signal may grow over time and result in perceptible unsynchronized audio.

Another reason for misalignment of the audio data is attributed to "jitter buffer" which is a part of all wireless loudspeakers 104. Jitter buffers are there to ensure uniform, glitch free audio playback even if the wireless channel is not. The amount of buffering is generally left to the device and the decision on how to handle that buffer is also left to the device. In a heterogenous system with different kinds of wireless loudspeakers 104, jitter buffers may be a major contributor to the lack of channel synchronization. This results not only in suboptimal performance but also in confusion because human ears are very sensitive to misalignments in the sound signal. Experimental data with commercially available wireless devices indicates that the change in delay over time is not constant and cannot be accurately modeled. This implies that a real-time correction mechanism is needed to correct the misalignments of audio channels (or misalignment between the loudspeakers that playback the audio data at different channels) and to keep the audio in sync. Such audio channels may correspond but not limited to stereo sound such as using two or more independent channel, 4.0 surround sound channels (e.g., left/front, right/front, left/rear, and right/rear), 5.1 surround sound (e.g., 5 standard loudspeakers and one subwoofer or center loudspeaker, left and front loudspeakers, left and right rear loudspeakers), and 7.1 surround sound channels (e.g., using the 6 loudspeakers as noted for 5.1 surround sound in addition to two extra side loudspeakers).

Each of the systems 100, 120, and 140 may accurately determine a delay between the audio channels and correct the misalignments in the audio channels using, for example, a signature that utilizes ultrasound (or ultrasonic) signatures or beacons. Ultrasounds generally refer to sound signals that includes frequencies above the human hearing range. The normal human hearing range is 20 Hz to 20 kHz. By using short bursts of ultrasonic signatures above 20 kHz, synchronization beacons may be superimposed on the audio streams which are then played back by the loudspeakers 104 for subsequent alignment by the audio source 102. For example, the audio source 102 may include at least one microphone 108 (hereafter "the microphone 108") that captures the signature beacons from the loudspeakers 104 and perform, for example, a cross-correlation. Once a beacon signature is detected, the delay between the processor of the audio source 102 and the captured audio signal can be determined. By determining the channel delays in all wireless channels (or by determining the delay for all of the audio outputs provided by the loudspeakers 104), the audio source 102 may then employ appropriate synchronization strategies to correct channel latency as well as correct the fluctuating delays (or drift) between the sink devices. The audio source 102 in any of the systems 100, 120 and 104 may generate a synchronization signal that includes signatures at regular or known intervals that may be tracked over time.

Figure 4:
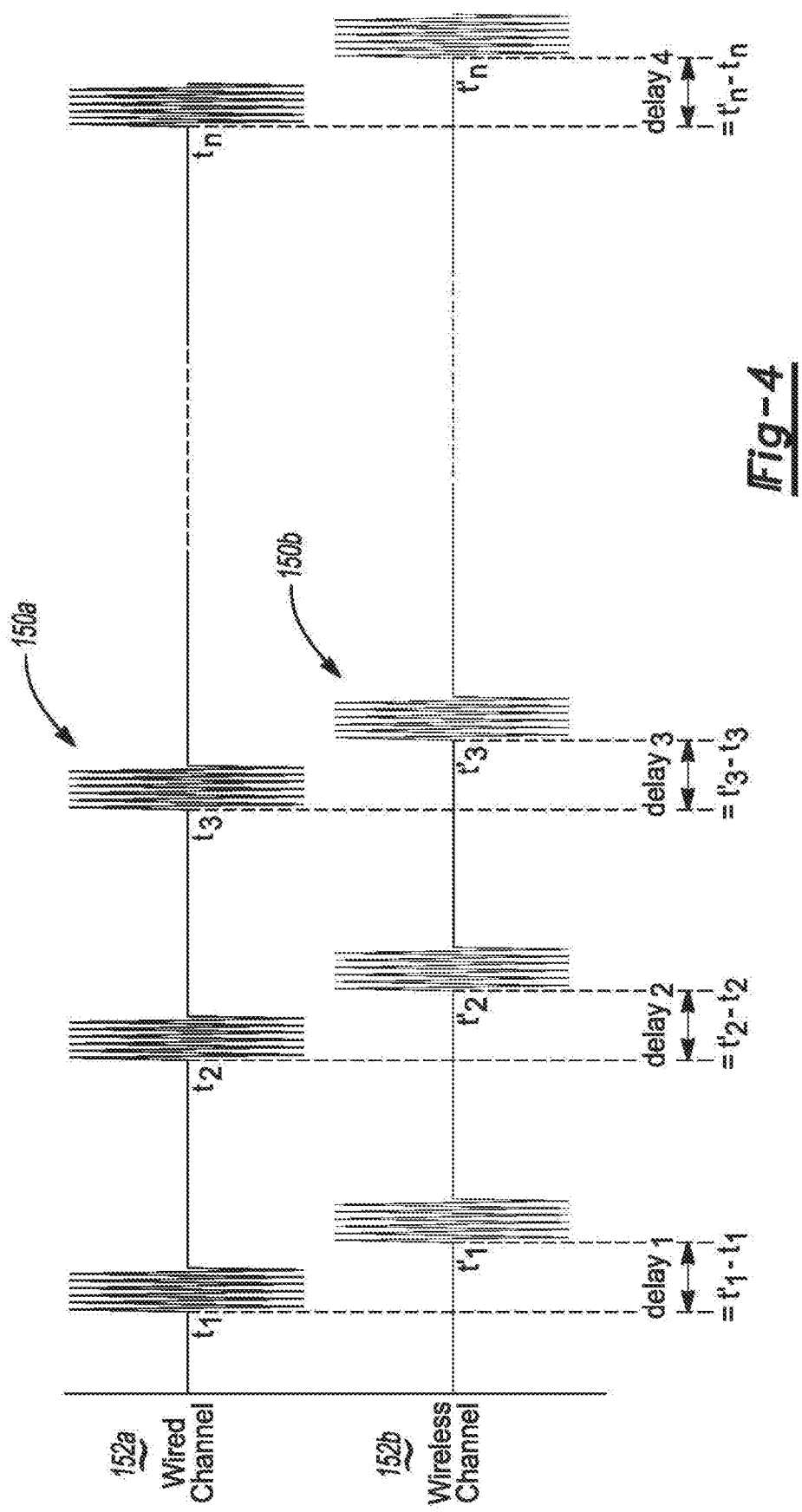
FIG. 4 depicts an example of audio signals between unsynchronized channels.

FIG. 4 depicts an example of audio signals 150a, 150b between unsynchronized first and second channels 152a, 152b, respectively. The second channel 152b is delayed in reference to the first channel 152a. The time difference between first and second channels 152a, 152b causes audio synchronization delays which negatively impact the audio experience. The synchronization delay, in real time audio systems, may not be constant and such a variation in the delay is called drift. The first channel 152a may correspond to a wired channel (e.g., an audio output provided on channel that is output to a loudspeaker 104 via a wired connection). The second channel 152b may correspond to a wireless channel (e.g., an audio output provided on a channel that is output to a loudspeaker 104 via a wireless connection). In an ideal system, the delay between the first channel 152a (e.g., the wired channel) and the second channel 152b (e.g., the wireless channel) stays constant. However, in an actual system, due to a lack of a recovery or a feedback mechanism, the delay between the channels 152a, 152b changes over time as exhibited by:

$$\text{drift\_1}_i = \text{delay}_{i+1} = \text{delay}_{start}$$

where $\text{delay}_{start}$ is a startup delay which may be computed as a mean of delay values in, for example, the first few minutes of startup of the systems 100, 120, or 140, and 100341 where $\text{drift}_1$ indicates the manner in which the delay has changed from the start-up delay.

Another way to view the drift is as follows:

$$\text{drift\_2}_i = \text{delay}_{i+1} - \text{delay}_i$$

where $\text{drift}_2$ is the difference in delays between two consecutive frames and indicates the manner in which the delay has changed from a previous frame.

The audio source 102 may use both metrics to quantify a latency and a change in latency over time (e.g., drift) between wireless channels.

Figure 5:
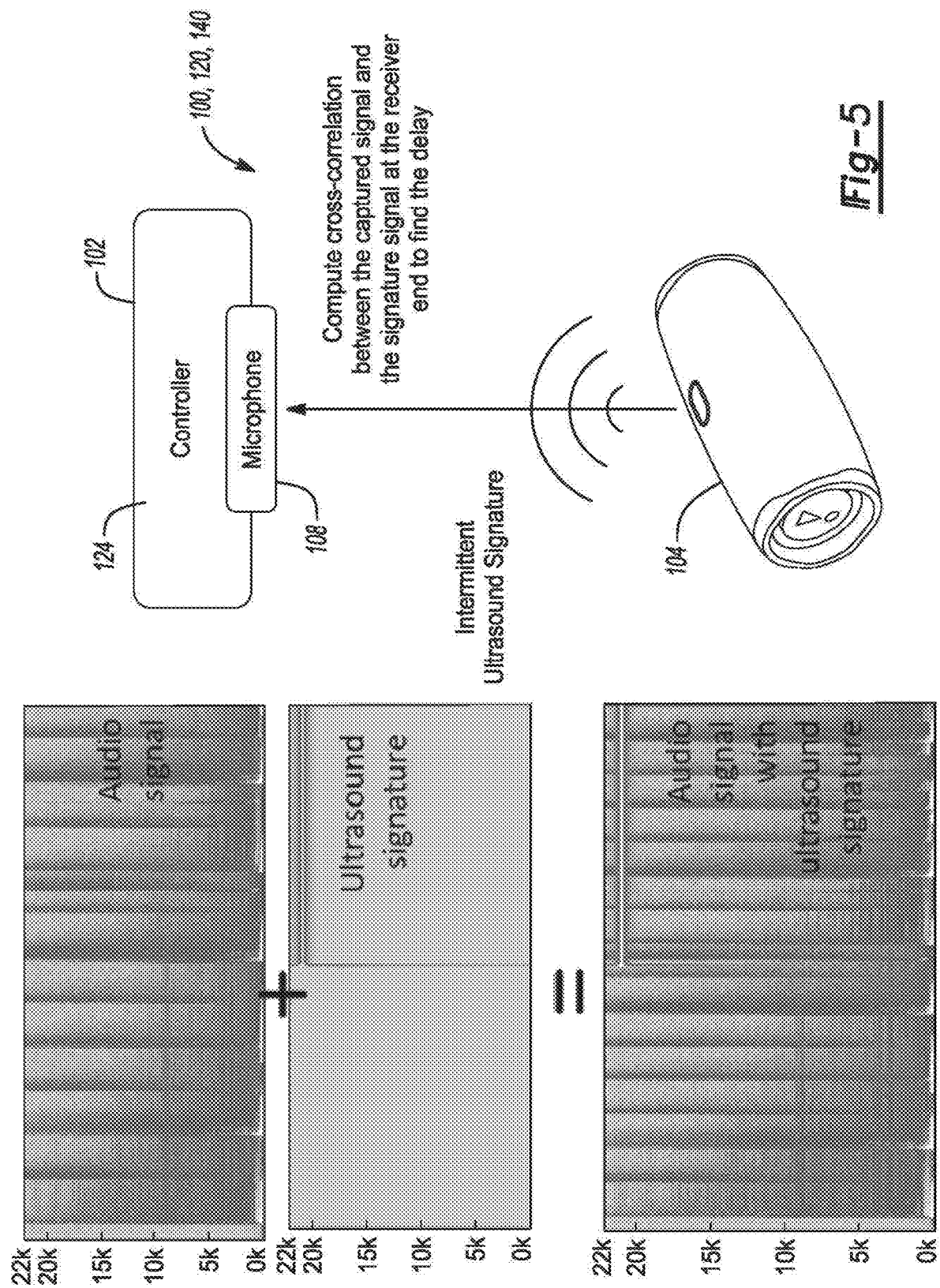
FIG. 5 depicts one example of a multichannel wireless audio system that transmits an ultrasound signature on an audio signal to determine a channel delay for synchronization in accordance with one embodiment.

FIG. 5 depicts one example of a multichannel wireless audio system 100, 120, or 140 that transmits an ultrasonic signature on an audio signal to determine a channel delay for synchronization in accordance with one embodiment. The audio source 102 includes any number of controllers (or microprocessors) 124 (hereafter "the controller 124"). Once the audio source 102 triggers a synchronization (or sync) sequence, the loudspeaker(s) 104 plays audio embedded with the sync signatures (e.g., ultrasonic-based signatures). The microphone 108 on the audio source 102 captures the sync signatures and determines the total latency of the system 100, 120, 140 from the time at which a request was trigger the sync sequence to the time in which the sync signature is captured by the microphone 108 and by the controller 124. In general, the captured signal may be delayed not only by the drift (e.g., drift is the change in delay over time), but also by software delays (e.g., software delays by the audio source 102 and the loudspeaker 104) as well as a delay due to the acoustic path.

The total delay computed via cross-correlation, matched filter, or related methods by the audio source 102 may include the following:

$$\text{Total delay} = \tau = \tau\_RF + \tau\_\text{software} + \tau\_(\text{acoustic path}) + \tau\_(\text{delay drift})$$

where:

$\tau\_RF$ is the time to account for RF signal transmission, $\rho\_\text{software}$ is a delay introduced by software from the audio source 102 and the loudspeaker 104, $\tau\_(\text{acoustic path})$ is a time for the sync signature to travel from the loudspeaker 104 to the microphone 108 ($\tau\_(\text{acoustic path})$ may correspond to 330 meters/sec).

$\tau\_(\text{delay drift})$ is a delay introduced by a wireless transmission drift, and $$\tau\_(\text{delay drift}) = \tau_{baseline} - (\tau\_RF + \tau\_\text{software} + \tau\_(\text{acoustic path})).$$

The audio source 102 performs cross-correlation to determine the total delay ($\tau$). Cross-correlation generally refers to a measure of a similarity of two sets of data based on a displacement relative to both sets of data.

Assuming, ($\tau\_RF + \tau\_\text{software} + \tau\_(\text{acoustic path})$ is constant, $\tau$ (delay drift) may be determined by taking two or more measurements over time. For example, the audio source 102 may use a first measurement in time (t) that is a total sum of $\tau\_RF + \tau\_\text{software} + \tau\_(\text{acoustic path})$ as a baseline (e.g., $\tau_{baseline}$) and then compares subsequently measured second, third, fourth and so on as subsequently obtained measurements in time (t) and compares each of the same to the baseline measurement (e.g., $\tau_{baseline}$) to determine the delay drift. The audio source 102 obtains the difference between the baseline measurement (or baseline delay) (e.g., $\tau_{baseline}$) and the subsequently obtained measurements of $\tau\_RF + \tau\_\text{software} + \tau\_(\text{acoustic path})$ to determine the delay drift. The drift (e.g., $\tau\_(\text{delay drift})$) may be determined based on a first measurement, or based on an average of N measurements.

Figure 6:
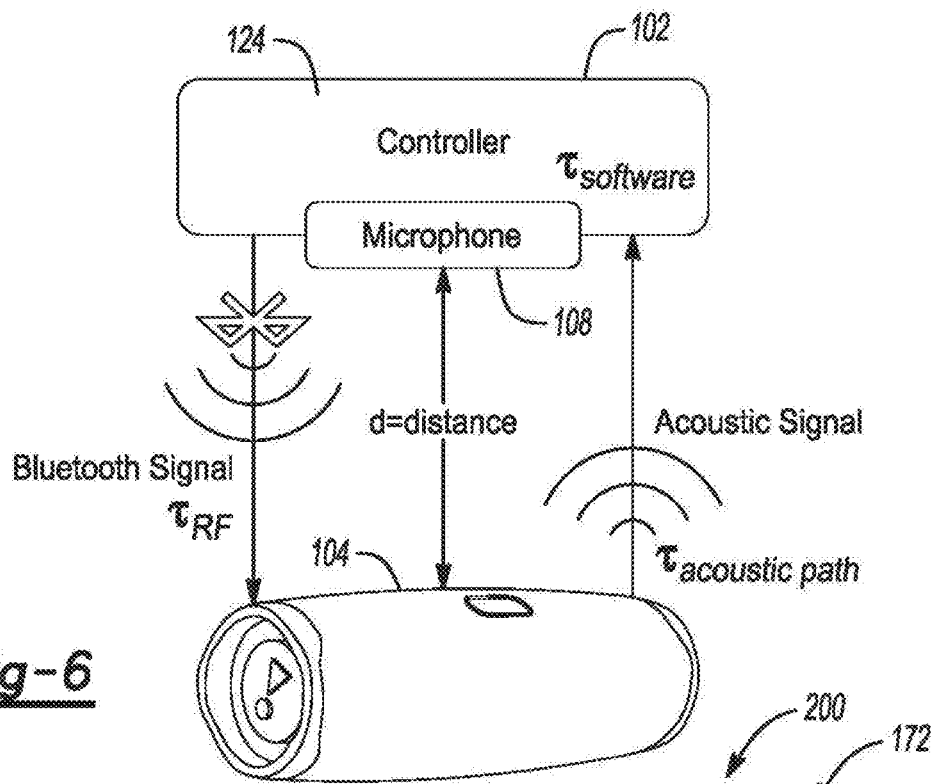
FIG. 6 depicts one example of latencies for a multi-channel wireless audio system.

FIG. 6 depicts one example of latencies for any one or more of the multi-channel wireless audio systems 100, 120, and 140. As shown, the controller 124 transmits the audio signal as a Bluetooth signal (e.g., over a time, $\tau\_RF$) over a distance, d to the speaker 104. The loudspeaker 104 transmits the audio output (e.g., over time, $\tau\_(\text{acoustic path})$) over the distance, d back to the microphone 108 of the audio source 102. The audio source 102 determines the drift based on the following equation as noted above: $\tau\_(\text{delay}) = \tau_{baseline} - (\tau\_RF + \tau\_\text{software} + \tau\_(\text{acoustic path}))$.

Figure 7:
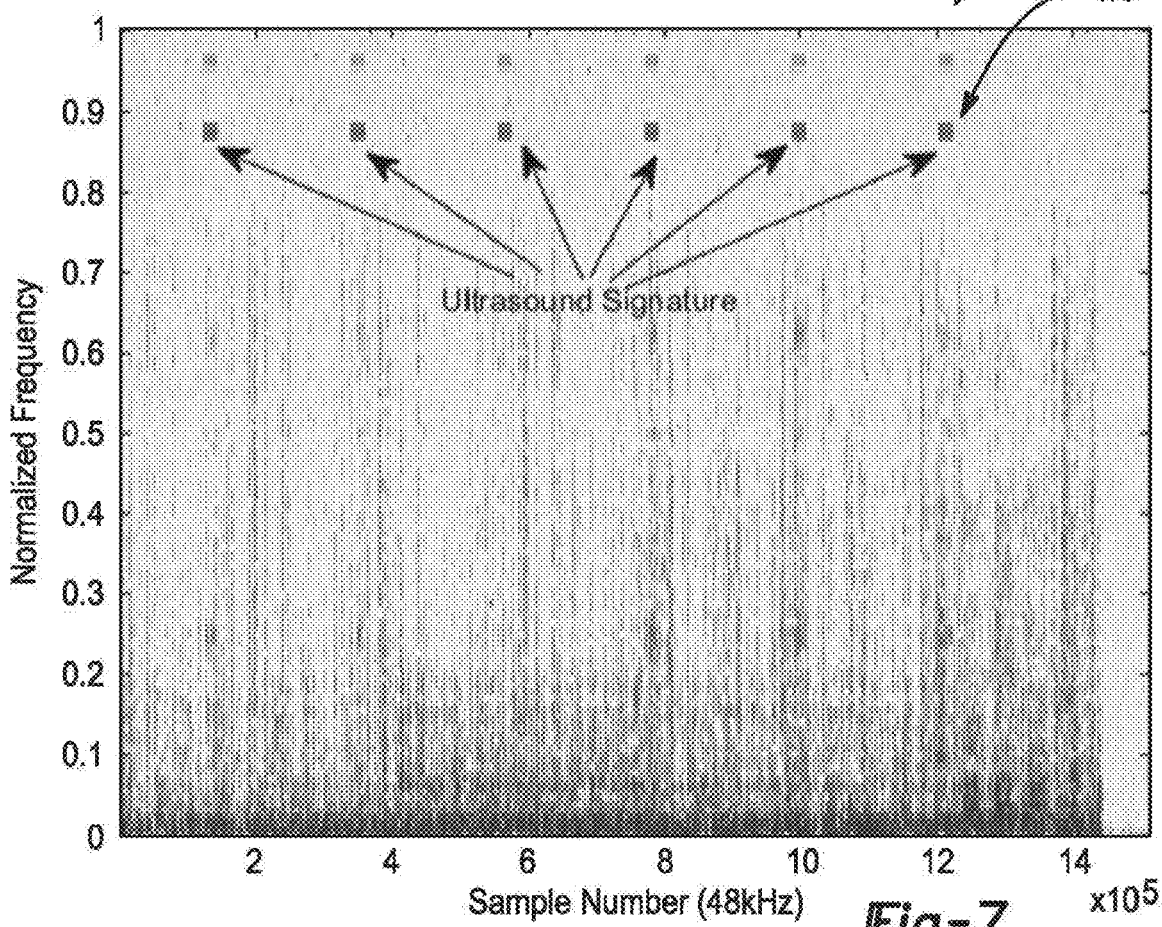
FIG. 7 depicts a spectrogram of an audio sample with ultrasound signatures in accordance with one embodiment.
Figure 8:
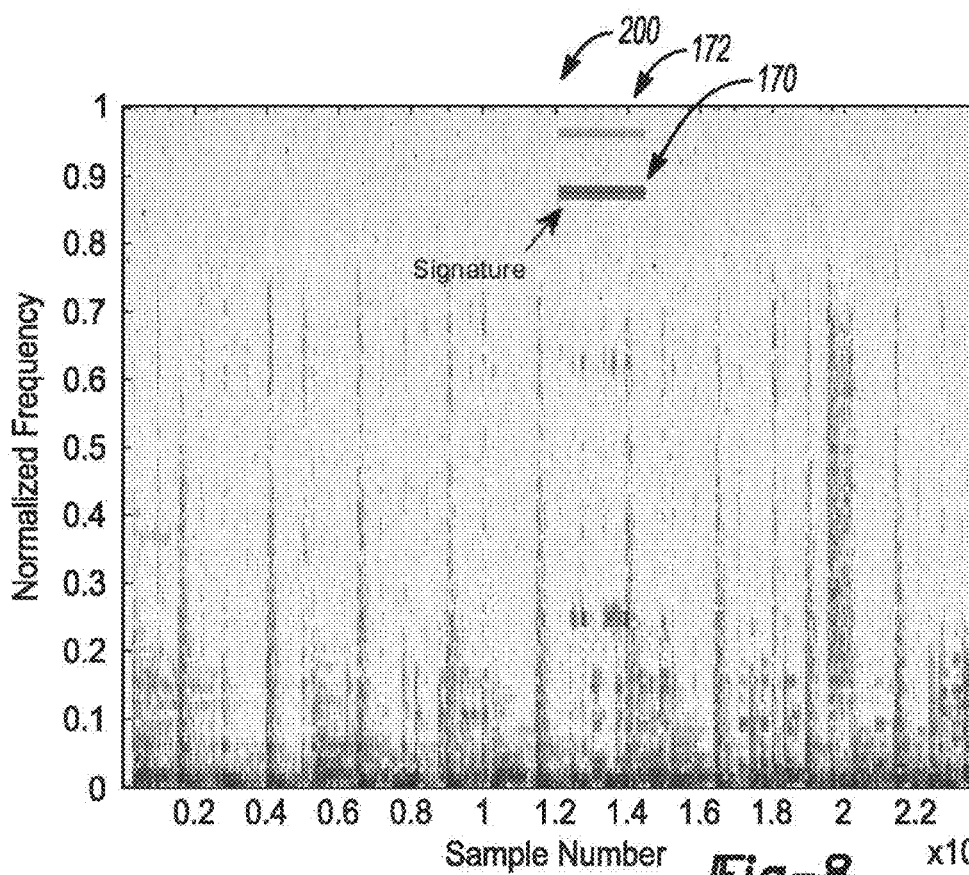
FIG. 8 depicts a more detailed view of the spectrogram of the audio sample with the ultrasound signature in accordance with one embodiment.

FIG. 7 depicts a spectrogram 200 of an audio signal with ultrasonic signatures 170 in accordance with one embodiment. The spectrogram 200 corresponds to a one-minute audio sample with ultrasonic signatures 170 that are embedded at different time intervals. Harmonics 172 are illustrated above the ultrasonic signatures 170 and are inherently provided due to the inclusion of the ultrasonic signatures 170 on the audio sample. The ultrasonic signatures 170 are not audible since such signatures 170 are above the frequency threshold of human hearing. FIG. 8 depicts a more detailed view of the spectrogram 200 of the audio sample with the ultrasonic signature 170 in accordance with one embodiment.

Figure 9:
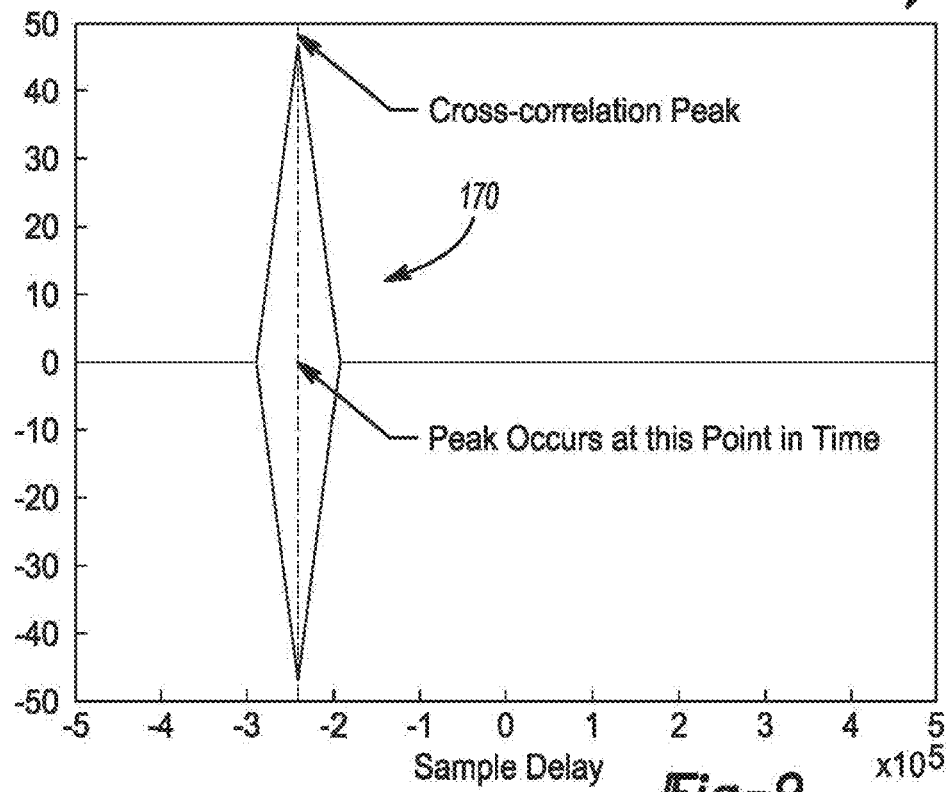
FIG. 9 corresponds to a plot exhibiting an auto-correlation output when cross-correlating an audio signal with an ultrasound signature and a signature key in accordance with one embodiment.

FIG. 9 corresponds to a plot 210 exhibiting an auto-correlation output when cross-correlating an audio signal with an ultrasonic signature and a signature key in accordance with one embodiment. In general, the audio source 102 receives a recorded audio signal (e.g., (y)) along with a signature audio sample (e.g., (x)) via the microphone 108 from the loudspeaker 104. The audio source 102 performs cross-correlation to measure the similarity between the ultrasonic signature 170 (e.g., (x)) and shifted (or lagged) copies of the audio signal, y as a function of the lag. In general, the cross correlation between the audio signal and the ultrasonic signature is highest when the signature is completely detected in the audio signal. The cross-correlation peak signifies a reliable measurement of the delay (and hence the latency) between audio source 102 and the loudspeaker 104.

In an ideal system, i.e., with no delay drift, the delay should remain constant over time. However, in actual systems the delay changes over time; therefore, the audio source 102 for the systems 100, 120, and 140 may perform a measurement at a start of the audio transmission, which serves as a baseline delay $\tau_{baseline}$ or $(\tau_{RF}+\tau_{software}+T\tau_{acoustic\ path})$. The audio source 102 may then perform delay measurements, taken at later time intervals (or periodically) and compare such later measurements are compared with the baseline delay (e.g., startup delay) to compute the drift.

Referring back to FIGS. 1, 2, and 3 (or the systems 100, 120, and 14); the audio source 102 collects delay measurements from different loudspeakers 104 (or the sink devices). It is recognized that other devices may collect the delay measurements and that such devices may not necessarily be the source that transmits the audio signal and the ultrasonic signatures 170. The audio source 102 utilizes the delay values to correct the latencies between the loudspeakers 104 and thus synchronize the wireless channels.

As noted above, the microphone 108 of the audio source 102 records the audio signal along with the ultrasonic that is played back by the loudspeakers 104. The audio source 102 provides the ultrasonic signatures 170 on the audio signal prior to the loudspeaker 104 playing back the audio signal as part of a synchronization process (or method). The synchronization process also involves the microphone 108 of the audio source 102 recording the acoustic signal along with the signature 170 that is played by the wireless speaker 104. The microphone 108 (or acoustic sensor) may be arranged to have a frequency response that is beyond the human auditory range so that the microphone 108 can record the ultrasonic frequencies. As noted above, the normal human hearing range is 20 Hz to 20 kHz. Thus, the microphone 108 may be configured to record the audio signal within the human hearing range as well as the bursts of ultrasonic signatures 170 above 20 kHz. Alternatively, the microphone 108 may be configured to record acoustic signals within a specific frequency range (e.g., 20 to 22 kHz). The synchronization process could be initiated every few minutes to correct the error or as needed.

After the audio source 102 records the played back audio signal for a predetermined amount of time (e.g., a few seconds), the audio source 102 stops the recording process. The predetermined amount of time may generally correspond to a time frame that enables the audio source 102 sufficient time to record a full signature (or ultrasonic signature 170) while taking into account system delays and signature duration. The audio source 102 may then cross-correlate with audio signal (e.g., audio data that is within the human auditory frequency range) with the ultrasonic signatures 170 to compute the delay.

For example, each of the systems 100, 120, and 140 may perform the synchronization process as follows. The audio source 102 may mix or superimpose the ultrasonic signatures 170 with the audio signal that is being transmitted to the loudspeaker(s) 104. The audio source 102 may then initiate recording the audio signal along with the ultrasonic signatures 170 and continues to record the audio signal with the ultrasonic signatures 170 for the predetermined amount of time. The audio source 102 performs cross-correlation on the recorded signal with the ultrasonic signatures 170 to compute the delay. In one example, the audio source 102 may utilize a matched filter to compute the signal delay or any signal processing technique that enables fair estimation of delay. It is recognized that the controller 124 may execute software related to the signal processing technique that enables the estimation of the delay.

The audio source 102 may then compare the delay to a baseline delay (e.g., as a baseline delay e.g. $(\tau_{RF}+\tau_{software}+\tau_{acoustic\ path})$ as noted above. The audio source 102 may then determine if the delay has changed from the baseline delay. If this condition is true, then the audio source 102 may then adjust for the difference between the calculated delay and the baseline delay (by updating the current delay value) and synchronize the transmission of the audio streams to the loudspeaker(s) 104.

Figure 10:
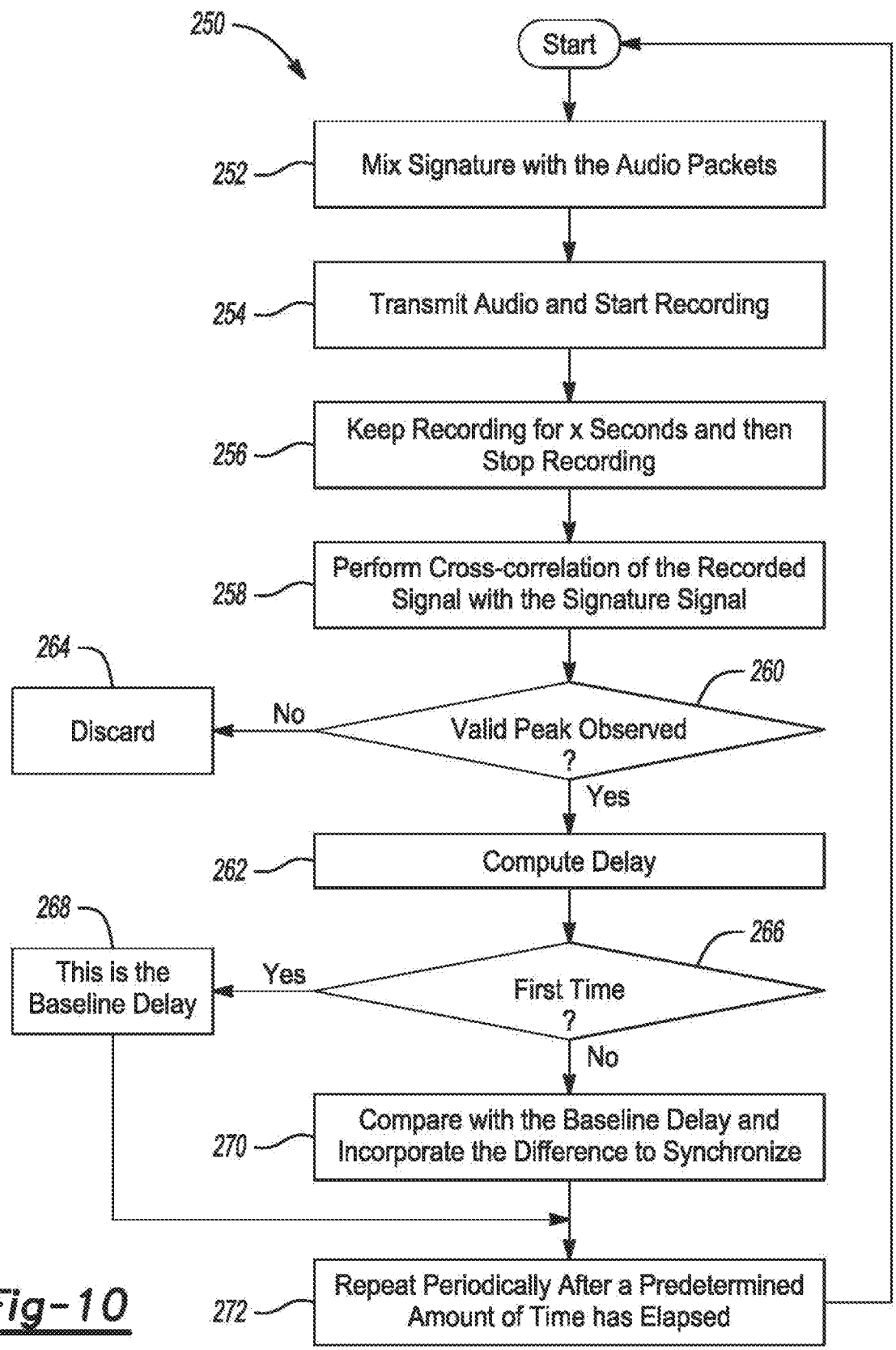
FIG. 10 depicts a method for performing synchronization for the multi-channel wireless audio system in accordance with one embodiment.

FIG. 10 depicts a method 250 for performing synchronization for the multi-channel wireless audio system in accordance with one embodiment. It is understood that any one or more of the systems 100, 120, or 140 may execute the method 250 (or the synchronization and adjustment method). The operations performed by the method 250 may generally include the audio source 102 performing multiple point-to-point connections with each of the loudspeakers 104. In this case, the audio source 102 inserts ultrasonic signatures (e.g., sequentially) for the audio transmitted to one or more of the loudspeakers 104 in the system 100, 120, or 140 in, for example, a round-robin manner to then determine the delay for each given loudspeaker 104 (or to determine the delay for each given loudspeaker 104). It is recognized that the audio source 102 may perform any one or more of the operations noted in connection with the method 250 for an audio signal that is transmitted to one or more loudspeakers 104 and for each audio signal that is transmitted back to the audio source 102 from the one or more loudspeakers 104 so that the audio source 102 may determine the delay between the audio source and one or more loudspeakers 104 in the system 100, 120, or 140. The audio source 102 may determine the delay for each loudspeaker 104 in a sequential manner and then synchronize the playback from the corresponding loudspeaker 104 that exhibited the delay sequentially as well.

In operation 252, the audio source 102 superimposes the ultrasonic signatures 170 onto the audio signal that is transmitted for each audio signal transmitted to the loudspeaker 104 for playback. As noted above, this may be performed sequentially between all of the loudspeakers 104 in the system 100, 120, or 140. For the avoidance of doubt, it is recognized that the operations noted below (e.g., 254, 256, 258, 260, 262, 264, 266, 268, 270, and 272) also apply between the audio source 102 and the any of the corresponding loudspeakers 104 in the system 100, 120, 140.

In operation 254, the audio source 102 transmits the audio signal along with the ultrasonic signatures 170 for audio signal that is transmitted to the loudspeakers 104. The audio source 102 also initiates a recording sequence to start to record the audio signal and the ultrasonic signatures 170 that are being played back by the loudspeaker 104.

In operation 256, the audio source 102 records the audio signal with the ultrasonic signatures 170 for the predetermined amount of time. Upon expiration of the predetermined amount of time, the audio source 102 stops the recording sequence.

In operation 258, the audio source 102 performs cross-correlation for the recorded audio signal with the ultrasonic signatures 170 that is received back from the loudspeaker 104.

In operation 260, the audio source 102 determines whether a valid peak of the audio signal (or of the signature signal) has been observed. In general, a valid peak implies a strong cross correlation output which is indicative of the detection of the ultrasonic signature (see FIG. 9). If a valid peak has been observed, then the method 250 moves to operation 262. If not, then the method 250 moves to operation 264 where the audio source 102 discards the recorded audio signal along with the ultrasonic signatures 170. In one example, assuming that the signature signal is in the form of a double modulated ultrasonic tone, the audio source 102 may determine whether such peaks are present (e.g., top and bottom peak) at a predetermined amplitude for a predetermined period of time to determine that the valid peak of the audio signal has been observed.

In operation 262, the audio source 102 determines a delay based on $\tau_{RF} \tau_{software} + \tau_{acoustic\ path}$ as noted above.

In operation 266, the audio source 102 determines if this is the first time the delay has been calculated or determined. As noted above, the audio source 102 may, upon being powered up, determines a baseline delay (or a first-time delay) (or $\tau_{baseline}$). If this is the first time the delay has been determined by the audio source 102, then the method 250 moves to operation 268. If not, then the method 250 moves to operation 270. It is recognized that the method 250 itself may not be triggered upon power up, but also triggered on an on-demand basis as requested by the user.

In operation 268, the audio source 102 associates the computed delay to the baseline delay for comparison to subsequently calculated delays. Once the baseline delay has been established, the audio source 102 calculates subsequent delays at predetermined intervals thereafter.

In operation 270, the audio source 102 compares the baseline delay to the most recently calculated delay to determine a difference between such delays (see above). The audio source 102 may then adjust for the difference between the delays and synchronize the transmission of the audio streams to the various loudspeakers 104.

In operation 272, the audio source 102 waits a predetermined length of time to generate the ultrasonic signatures 170 on the audio signal to determine a new delay value for comparison to the baseline delay and for possible synchronization of the audio streams transmitted to the loudspeakers 104. In one example, the predetermined length of time may be 60 minutes. It is recognized that the predetermined length of time may be set to any desired time frame and that the predetermined length of time may be selected based on a desired criteria of a particular implementation.

Figure 11:
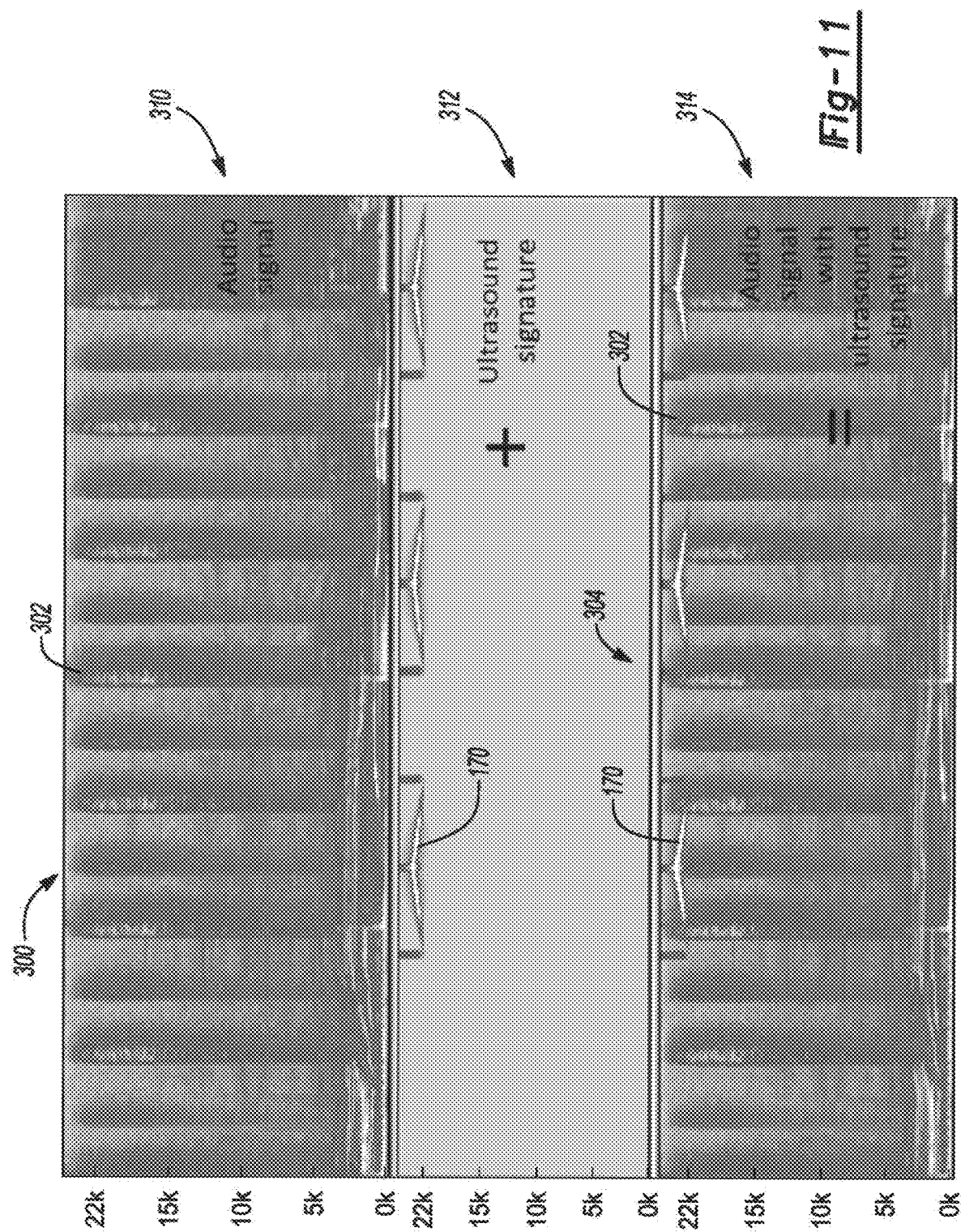
FIG. 11 depicts a plot having an audio signal that is mixed with a custom ultrasound signature for channel tagging in accordance with one embodiment.

FIG. 11 depicts a plot 300 having an audio signal 302 that is mixed with the ultrasonic signatures 170 for channel tagging in accordance with one embodiment. The audio signal 302 is generally shown at 310, the ultrasonic signatures 170 are generally shown at 312, and the combined audio signal 302 with the ultrasonic signatures 170 are generally shown at 314. In general, the type of ultrasonic signature 170 generally affects system accuracy. Some examples of the alternate signatures that the audio source 102 may provide, include but not limited to: (1) pure ultrasonic tones, (2) amplitude modulated ultrasonic tones, (3) double modulated ultrasonic tones (e.g., modulated tones tapered at the ends to prevent distortion in the audible frequency range), (4) modulated frequency sweep signals, etc. Each signature 170 may be customized by transmitting the signature 170 in short bursts (e.g., 200 millisecond bursts). Also, the spectral and amplitude characteristics of each signature 170 may be provided in individual bursts as illustrated in FIG. 11. Thus, the audio source 102 is programmed to generate the signature 170 such that the spectral and amplitude characteristics are provided to elicit optimal detection when received on the captured audio signal from the loudspeaker(s) 104. The spectral and amplitude characteristics for the signature 170 as exhibited in FIG. 11 may be used, for example, on a surround sound system such that the delay can be found on a single channel in the surround sound system.

Figure 12:
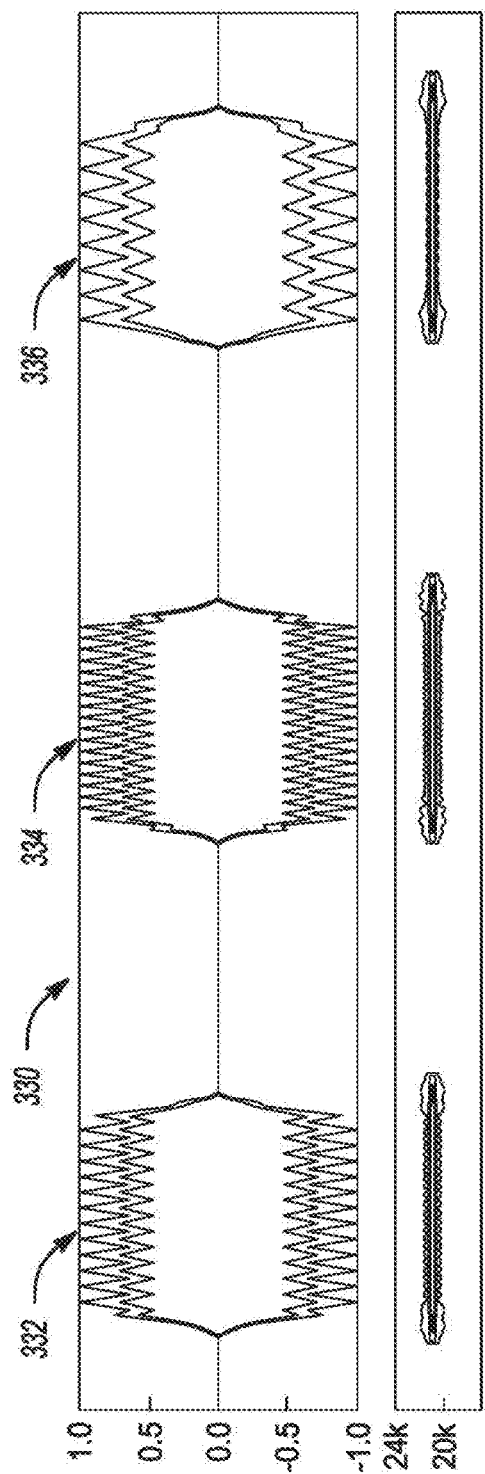
FIG. 12 depicts a plot that illustrates a double modulated burst signature pattern in accordance with one embodiment.

FIG. 12 depicts a plot 330 that provides a sequence of double modulated burst signatures 332, 334, and 336 in accordance with one embodiment. The sequence of double modulated burst signatures 332, 334, and 336 are illustrated in a time domain. As generally shown at 340, the sequence of double modulated burst signatures 332, 334, and 336 are generally shown in a frequency domain. The audio source 102 may generate the sequence of burst signatures 332, 334, and 336 in a customizable format. For example, the desire to provide customizable burst signatures (or patterns) 332, 334, and 336 may provide improved accuracy in computing the delay. The performance of matching any of the burst signatures 332, 334, and 336 in a sequence improves in comparison to that of a single burst. In addition, the sequence of burst signatures 332, 334, and 336 may be more robust to environmental noise, reverberation, and algorithm inaccuracies.

Customizable signatures may be linked to each loudspeaker 104. For example, the audio source 102 may generate a unique and customizable signature for each loudspeaker 104 in the system 100, 120, and 140. Thus, in this regard, the signature may provide for a unique address for each loudspeaker 104. This aspect aids in associating the signature (or waveform) from each loudspeaker 104 and in the identification of the delay profile for the respective loudspeaker 104.

Figure 13:
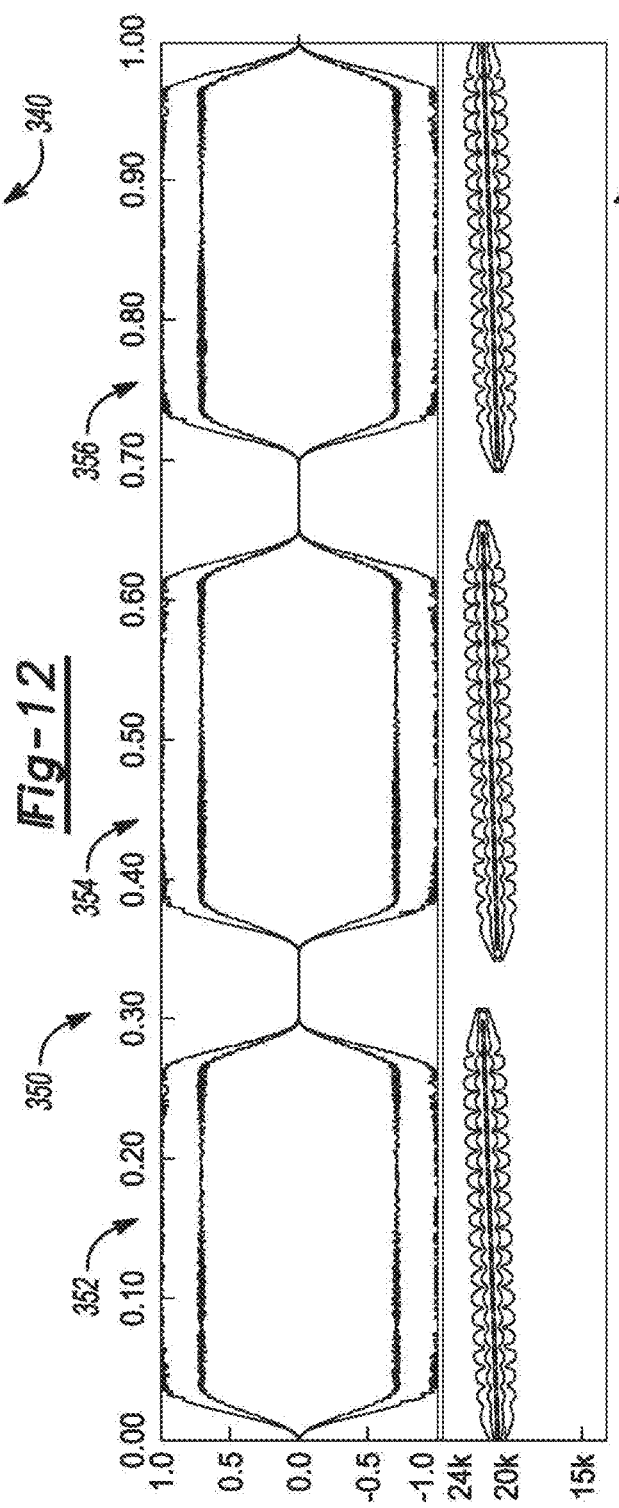
FIG. 13 depicts a plot that illustrates a modulated burst signature pattern with a frequency sweep signal in accordance with one embodiment.

FIG. 13 depicts a plot 350 that provides a sequence of double modulated burst signatures 352, 354, and 356 in accordance with one embodiment. The sequence of double modulated burst signatures 352, 354, and 356 are illustrated in a time domain. As generally shown at 360, the sequence of double modulated burst signatures 352, 354, and 356 are generally shown in a frequency domain. The audio source 102 may generate the sequence of burst signatures 352, 354, and 356 in a customizable format. As noted above, the desire to provide customizable burst signatures (or patterns) 352, 354, and 356 may provide improved accuracy in computing the delay. The performance of matching any of the burst signatures 352, 354, and 356 in a sequence improves in comparison to that of a single burst. Similarly, to that noted in FIG. 12, the sequence of burst signatures 352, 354, and 356 may be more robust to environmental noise, reverberation, and algorithm inaccuracies. Each of the burst signatures 352, 354, and 356 generally include a frequency sweep signal having an amplitude that is tapered at an end thereof.

Figure 14:
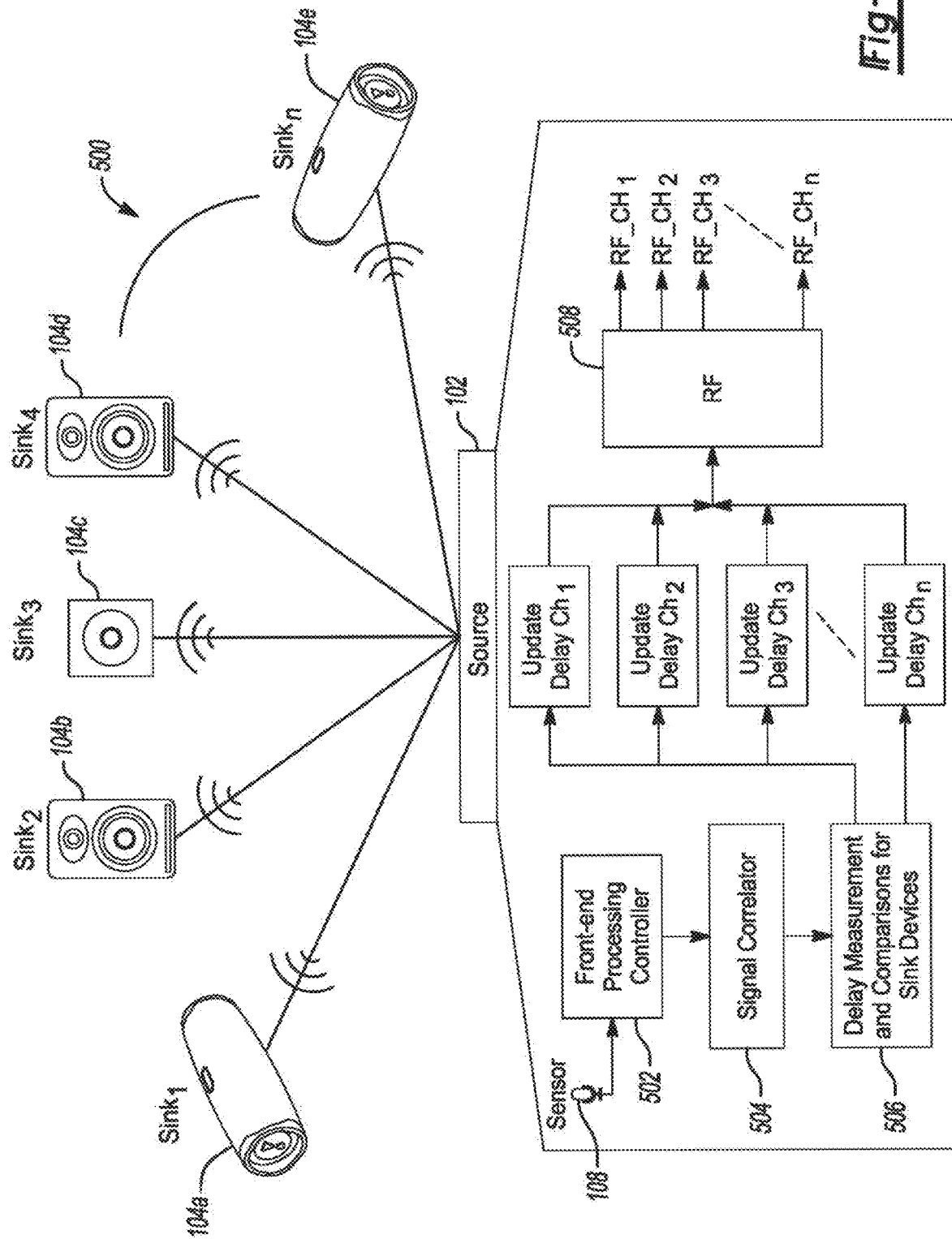
FIG. 14 depicts an example of a system performing synchronization for the multi-channel wireless streams in accordance with one embodiment.

FIG. 14 depicts an example of a system 500 performing synchronization for the multi-channel wireless streams in accordance with one embodiment. The system 500 includes the audio source 102 and the loudspeakers 104a-104e. The audio source 102 includes the microphone 108, a front-end processor 502, a signal correlator block 504, a delay generation block 506, and a transceiver 508. In operation, the microphone 108 captures the audio that is being played back by the various loudspeakers 104a-104e. The microphone 108 is operably coupled to the front-end processor 502 and provides the captured audio to the front-end processor 502 at predetermined time intervals. The front-end processor 502 is configured to: (i) improve the signal to noise ratio of the captured audio, (ii) enhance signal frequencies of interest (e.g., ultrasonic frequencies of the signatures 170), and (iii) address potential algorithm accuracies. The front-end processor 502 will be discussed in more detail in connection with FIG. 15.

The signal correlation block 504 includes, for example, a matched filter to detect the presence of the ultrasonic signatures 170 on the captured audio. The cross-correlation of the recorded signal with the ultrasonic signatures 170 is required to compute the delay. The delay generation block 506 determines the delay or lag for the audio on the various channels that are being played back by the loudspeakers 104a-104e. The delay generation block 506 accounts for the delays and updates the transmission of the audio based on the computed delay. For example, the delay generation block 506 may adjust the timing or update the delay of the audio that is transmitted from the audio source 102 for each channel (or for each loudspeaker 104 that plays back audio data for a given channel). By adjusting the delay for the audio signal for each channel, this aspect ensures that the different loudspeakers 104 playback the audio in a synchronized manner. As noted above, the audio source 102 performs this recalibration on a periodic basis to account for variable drifts that may be generated between the different channels in the system 500.

The delay generation block 506 normalizes the delays across the channels and then updates the same. In general, the normalization may include aspects such as ignoring delays that are out of range, possibly due to an incorrect signature detection or device (e.g., loudspeaker 104) not working properly or anything that may yield an improper reading. In addition, the normalization may include performing a correction to apply a reduction to avoid buffer underruns at the audio source 102 if delays are more than the samples that are available in the buffer of the audio source 102. It is recognized that delays may be positive or negative. A negative delay may involve increasing all applicable delays such that negative delays may be set to zero. The delay generation block 506 forwards the re-aligned delays to the transceiver 508 (e.g., radio frequency transceiver). The transceiver 508 may then transmit the re-aligned audio streams to the loudspeakers 104 for playback.

Figure 15:
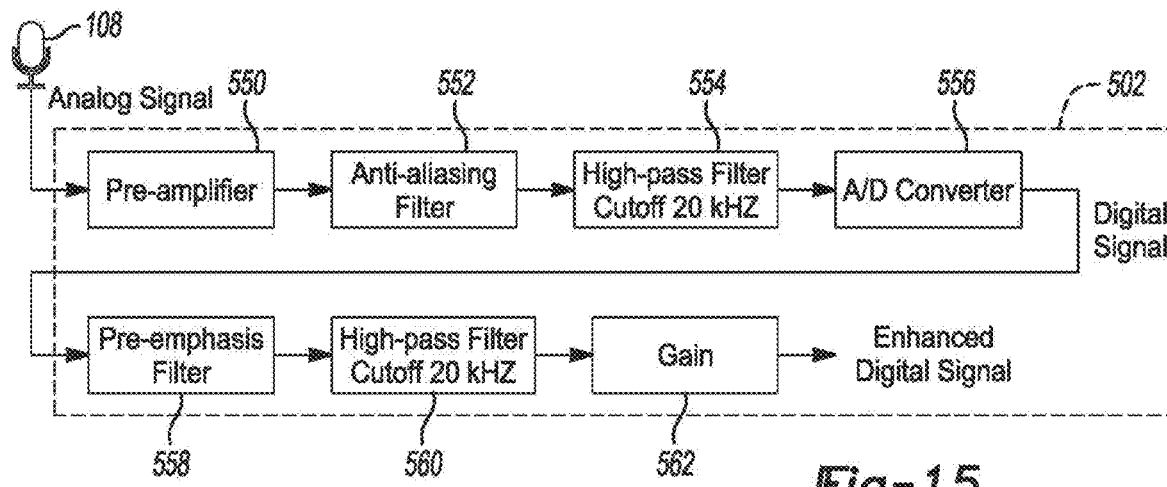
FIG. 15 depicts a front-end controller that is part of the system of FIG. 14 for providing signal conditioning and enhancement in accordance with one embodiment.

FIG. 15 depicts a block diagram of the front-end controller 502 that is part of the system 500 of FIG. 14 for providing signal conditioning and enhancement in accordance with one embodiment. The front-end controller 502 includes a pre-amplifier 550, a first filter 552, a second filter 554, an analog to digital (A/D) converter 556, a third filter 558, a fourth filter 560, and a gain block 562. The front-end controller 502 may enhance the front-end signal acquisition of the captured audio and the ultrasonic signatures 170 using the various filters 552, 554, 558, and 560 at different stages of the signal acquisition pipeline. The combination of the front-end signal processing and ultrasonic signatures 170 results in a robust channel synchronization strategy that may be used for a variety of audio applications.

The pre-amplifier 550 receives the captured audio along with the ultrasonic signatures 170 from the microphone 108 and boosts the same prior to processing the ultrasonic signatures 170. The first filter 552 may be an anti-aliasing filter (or low pass filter) to anti-alias the captured audio signal and the ultrasonic signatures 170 prior to conversion into a digital domain. The first filter 552 may enable frequencies that are less than 24 kHz to pass through. The second filter 554 may be a high pass filter and enable frequencies above 20 kHz to pass therethrough. The first filter 552 and the second filter 554 may generally form a bandpass filter that enables frequencies in the range of 20 to 24 kHz to pass to the A/D converter 556. The A/D converter 556 converts the captured and the filtered audio signal and the ultrasonic signatures 170 from an analog signal into a digital signal. The third filter 558 may be implemented as a pre-emphasis filter and reduces the amount of noise that is provided on the digitally based audio signal and ultrasonic signatures 170. The fourth filter 560 (or high pass filter) also enables the output of the pre-emphasis filter 558 to pass frequencies above, for example, 20 kHz. The gain block 562 applies a gain to the output of the fourth filter 560 to boost the output therefrom.

In everyday environments, acoustic energy is spread across the entire acoustic frequency spectrum. Noise from various sources may be captured by the microphones and results in signal degradation and a lower signal-to-noise ratio. This adversely impacts accuracy of the cross-correlation performed by the system 500. The front-end controller 502 may not only prime or condition the audio signal and the ultrasonic signatures 170 for subsequent processing but also improves the overall system accuracy. Furthermore, the front-end controller 502 enables the system 500 to be more robust against environmental noises in realistic/everyday locations and also enables reliability of the system 500 at longer distances.

Figure 16:
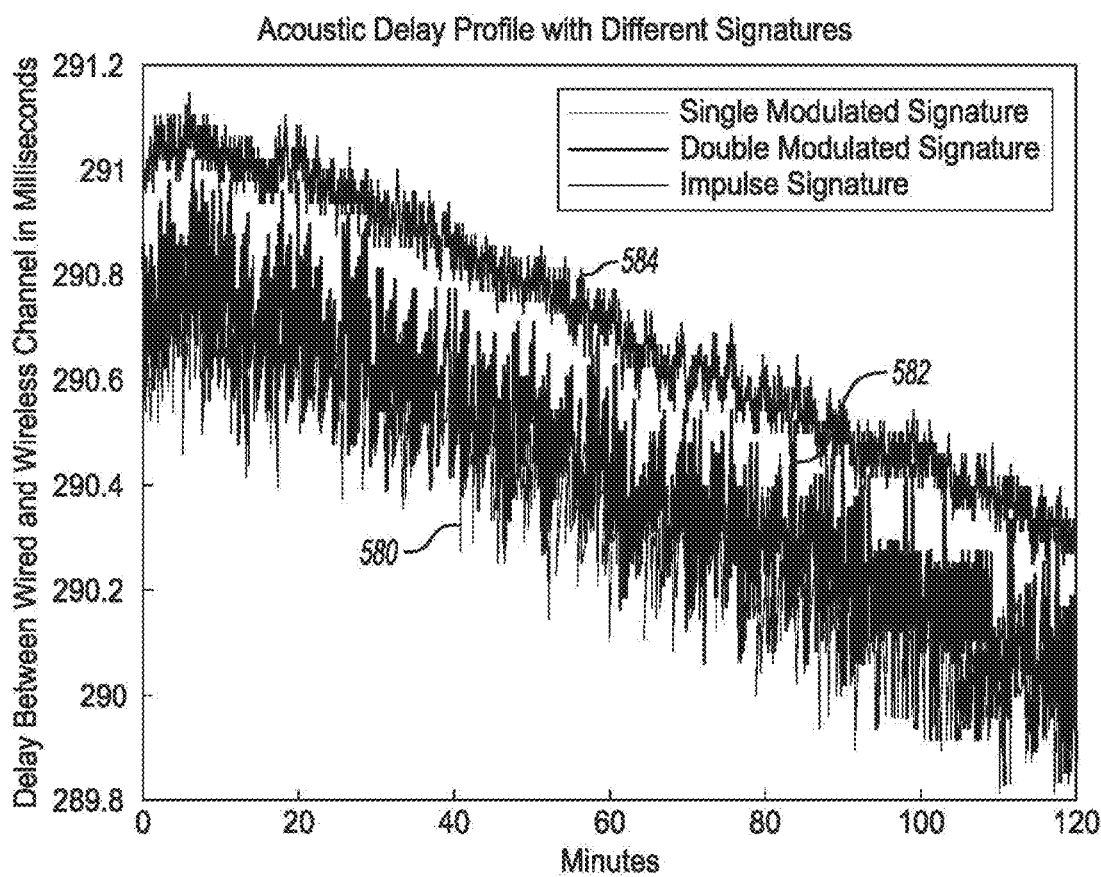
FIG. 16 depicts a delay profile with example of different signatures in accordance with one embodiment.

FIG. 16 depicts a delay profile with example of different signatures in accordance with one embodiment. The delay profile of the wireless channels over time may be computed using different time computed different synch signatures 580, 582, and 584. For example, FIG. 16 provides acoustic delay profiles for a single modulated signature 580, a double modulated signature 582, and an impulse signature 584 for a portable Bluetooth based loudspeaker. The latency of the wireless channel may be on the order of 290 ms. The latency of the wireless channel changes over time (e.g., a downward trend may be observed for this system). The drift is not constant and a transient behavior is observed along with various spikes. These aspects suggest that the delay varies from packet to packet. It is recognized that different ultrasonic signatures may have different computing accuracies.

Figure 17:
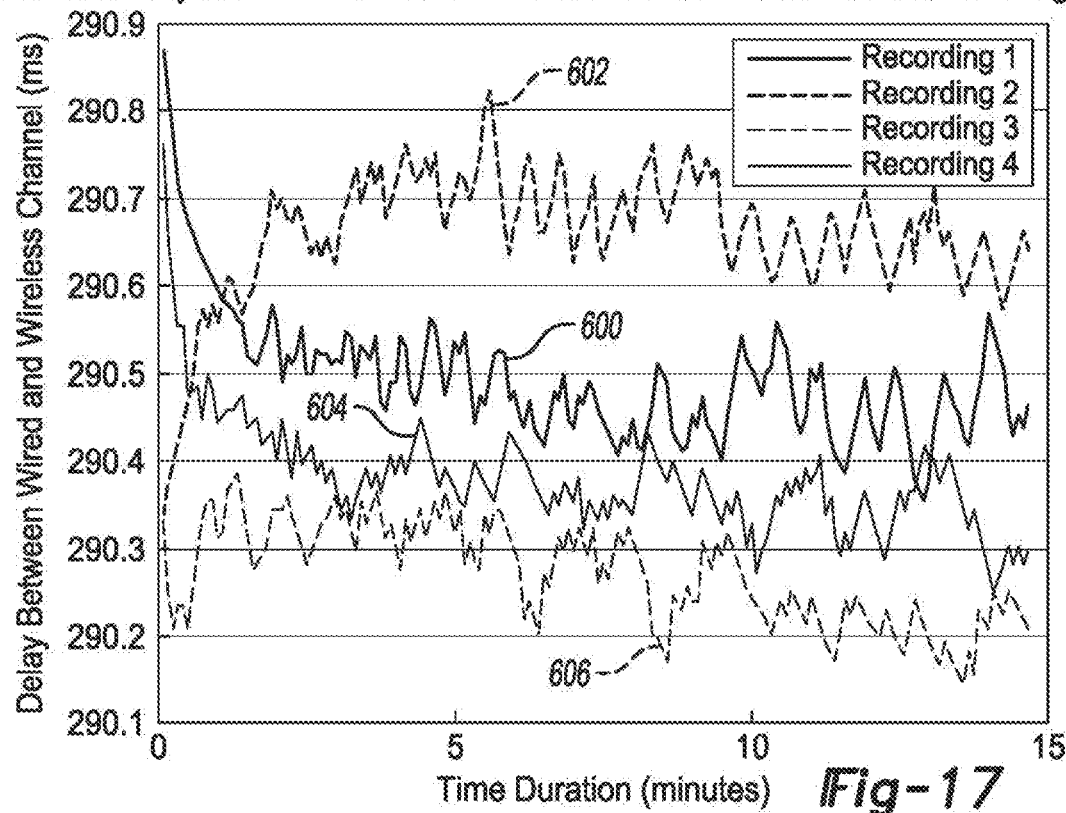
FIG. 17 depicts a delay profile over different recordings in accordance with one embodiment.

FIG. 17 depicts a delay profile for different recordings 600, 602, 604, and 606 in accordance with one embodiment. Specifically, FIG. 17 illustrates an example of experimental data from latency measurements with an ultrasonic signature 170 over four different recordings 600, 602, 604, and 606 for a period of 15 minutes. The results show that the delay varies from recording to recording which is indicative of the delay not following a fixed trend. In addition, the results illustrate that the delay is not static and that there are fluctuations and transients. These transients may indicate in-built self-correcting mechanisms for the drift. However, as can be seen from the data, such self-correcting mechanisms may not be effective in correcting the delay drifts.

Figure 18:
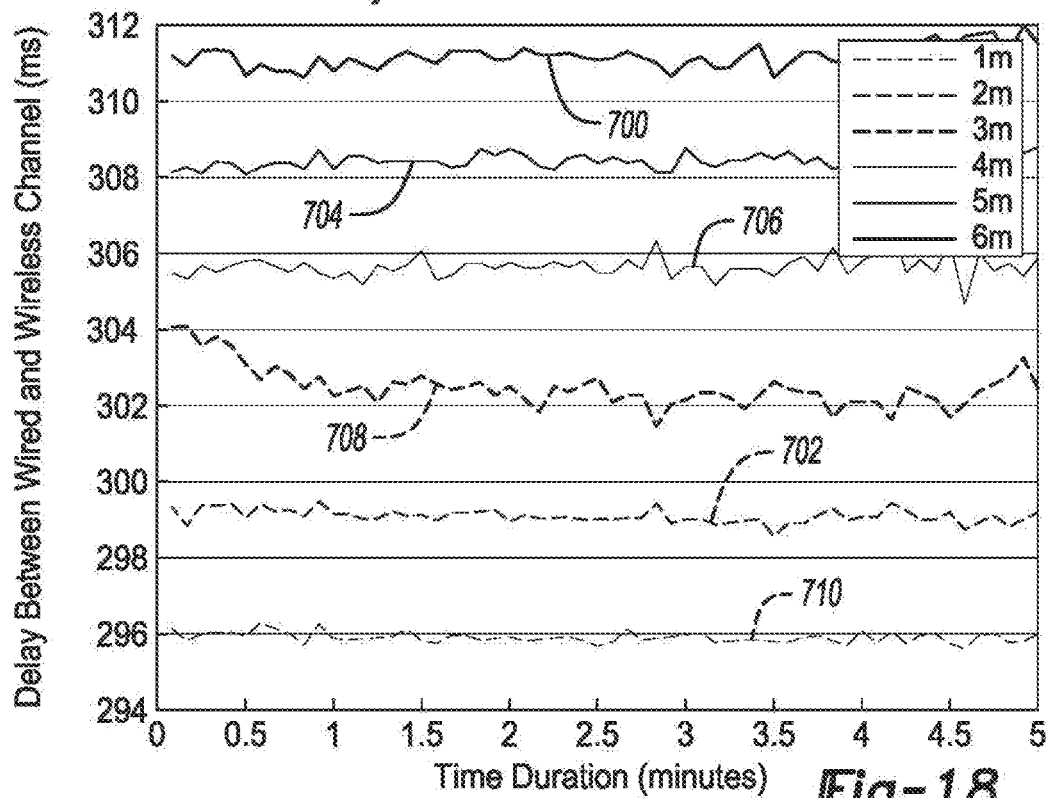
FIG. 18 depicts a delay profile over different distances between wired and wireless channels.

FIG. 18 depicts a delay profile over different distances between wired and wireless channels 700, 702, 704, 706, 708, and 710. The results indicate the effect of distance on delay (e.g., the distance of the audio source 102 and the loudspeaker 104 with the audio source 102 including the microphone 108).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for synchronizing an audio stream, the system comprising:
    a first loudspeaker configured to playback a first audio output signal including first audio packets and first signature information in response to a first audio input signal; and
    an audio controller programmed to:
        provide the first audio input signal;
        superimpose the first signature information on the first audio input signal prior to the first loudspeaker playing back the first audio output signal;
        receive the first audio output signal including the first audio packets and the first signature information;
        detect the first signature information on the first audio output signal;
        determine a delay attributed to a transmission of the first audio input signal and the first audio output signal based on the first signature information; and
        synchronize the transmission of a second audio input signal from the audio controller to the first loudspeaker such that the playback of a second audio output signal from the first loudspeaker is synchronized with the playback of another audio output signal from a second loudspeaker based at least on the delay.

2. The system of claim 1, wherein the audio controller is further programmed to determine if the delay is a first delay value that has been determined after at least one of the audio controller being powered on or a user command being received.

3. The system of claim 2 wherein the audio controller is further programmed to store the first delay as a baseline delay for comparison to one or more subsequently calculated delays to adjust for a difference between the one or more subsequently calculated delays and the baseline delay.

4. The system of claim 1, wherein the audio controller is further programmed to perform cross-correlation on the first signature information and the first audio output signal.

5. The system of claim 4, wherein the cross-correlation corresponds to a measurement between the first audio output signal and the first signature information and determining a displacement between the first audio output signal and the first signature information.

6. The system of claim 1, wherein the first signature information includes ultrasonic signatures above 20 kHz.

7. The system of claim 1, wherein the delay is indicative of a time that accounts for a radio frequency (RF) signal transmission of the first audio input signal and the first audio output signal, a time for the audio controller and the first loudspeaker to process the first audio input signal, and a time attributed for the first signature information to travel from the first loudspeaker to the audio controller.

8. The system of claim 1, wherein the first signature information includes one of an ultrasonic tone, an amplitude modulated ultrasonic tone, and a modulated frequency sweep signal.

9. The system of claim 1, wherein the first signature information includes a double modulated burst signal to improve a detectability of the first signature information at the audio controller.

10. A method for synchronizing an audio stream, the method comprising:
    providing, via an audio controller, a first audio input signal including audio packets and a first signature information to a first loudspeaker that plays back a first audio output signal including the audio packets and the first signature information;
    superimposing the first signature information on the first audio input signal prior to the first loudspeaker playing back the first audio output signal;
    receiving the first audio output signal and the first signature information;
    detecting the first signature information on the first audio output signal;
    determining, via the audio controller, a delay attributed to a transmission of the first audio input signal and the first audio output signal based on the first signature information; and
    synchronizing the transmission of a second audio input signal from the audio controller to the first loudspeaker such that the playback of a second audio output signal from the first loudspeaker is synchronized with the playback of another audio output signal from a second loudspeaker based at least on the delay.

11. The method of claim 10 further comprising determining if the delay is a first delay value that has been determined after at least one of the audio controller being powered on or has received a user command.

12. The method of claim 11 further comprising storing the first delay as a baseline delay for comparison to one or more subsequently calculated delays to adjust for a difference between the one or more subsequently calculated delays and the baseline delay.

13. The method of claim 10, wherein detecting the first signature information on the first audio output signal further comprising performing cross-correlation on the first signature information and the first audio output signal.

14. The method of claim 10, wherein the first signature information includes ultrasonic signatures above 20 kHz.

15. The method of claim 10, wherein the delay is indicative of a time that accounts for a radio frequency (RF) signal transmission of the first audio input signal and the first audio output signal, a time for the audio controller and the first loudspeaker to process the first audio input signal, and a time attributed for the first signature information to travel from the first loudspeaker to the audio controller.

16. The method of claim 10, wherein the first signature information includes one of an ultrasonic tone, an amplitude modulated ultrasonic tone, and a modulated frequency sweep signal.

17. The method of claim 10, wherein the first signature information includes a double modulated burst signal to improve a detectability of the first signature information at the audio controller.

18. A computer-program product embodied in a non-transitory computer read-able medium that is programmed for synchronizing an audio stream, the computer-program product comprising instructions for:
    providing, via an audio controller, a first audio input signal to a first loudspeaker to playback a first audio output signal in response to the first audio input signal;

superimposing first signature information on the first audio input signal prior to the first loudspeaker playing back the first audio output signal;

receiving the first audio output signal and the first signature information;

detecting the first signature information on the first audio output signal;

determining, via the audio controller, a delay attributed to a transmission of the first audio input signal and the first audio output signal based on the first signature information; and synchronizing the transmission of a second audio input signal from the audio controller to the first loudspeaker such that the playback of a second audio output signal from the first loudspeaker is synchronized with the playback of another audio output signal from a second loudspeaker based at least on the delay.

19. The computer program product of claim 18 further comprising determining if the delay is a first delay value that has been determined after at least one of the audio controller being powered on or has been received as a user command.

20. The computer program product of claim 18 further comprising storing the first delay as a baseline delay for comparison to one or more subsequently calculated delays to adjust for a difference between the one or more subsequently calculated delays and the baseline delay.

* * * * *